(12) United States Patent
Hymas (10) Patent No.: US 12,528,022 B1
(45) Date of Patent: Jan. 20, 2026

(54) COMFORT SYSTEM

(71) Applicant: Debra M. Hymas, American Fork, UT (US)

(72) Inventor: Debra M. Hymas, American Fork, UT (US)

( * ) Notice: Subject to any disclaimer, the term of this patent is extended or adjusted under 35 U.S.C. 154(b) by 104 days.

(21) Appl. No.: 18/098,077

(22) Filed: Jan. 17, 2023

Related U.S. Application Data

(60) Provisional application No. 63/300,126, filed on Jan. 17, 2022.

(51) Int. Cl.
*A63H 3/00* (2006.01)
*A63H 3/02* (2006.01)
*A63H 3/36* (2006.01)
*A63H 33/30* (2006.01)

(52) U.S. Cl.
CPC .............. *A63H 3/003* (2013.01); *A63H 3/001* (2013.01); *A63H 3/02* (2013.01); *A63H 3/36* (2013.01); *A63H 33/3094* (2013.01)

(58) Field of Classification Search
CPC ............ A63H 33/3022; A63H 33/3094; A63H 3/001; A63H 3/24
See application file for complete search history.

(56) References Cited

U.S. PATENT DOCUMENTS

| | | | | |
|---|---|---|---|---|
| 4,307,539 | A * | 12/1981 | Klein | A63H 33/3094 446/472 |
| 5,314,339 | A * | 5/1994 | Aponte | G09B 23/285 434/262 |
| 6,004,136 | A * | 12/1999 | Ehrenpreis | G09B 23/28 446/295 |
| 10,360,810 | B1 * | 7/2019 | Horowitz | G09B 19/00 |
| 10,441,893 | B2 * | 10/2019 | Wang | G09B 23/285 |
| 11,628,121 | B2 * | 4/2023 | Casano | A61J 1/16 604/408 |
| 2006/0223039 | A1 * | 10/2006 | Williams | G09B 23/28 434/262 |
| 2008/0096459 | A1 * | 4/2008 | Mingle | A63H 3/005 446/74 |
| 2008/0139076 | A1 * | 6/2008 | Frasier-Scott | A61M 5/14 446/72 |
| 2009/0149108 | A1 * | 6/2009 | Nakamura | A63H 33/3094 446/72 |
| 2018/0256449 | A1 * | 9/2018 | Moll | A61J 1/16 |

* cited by examiner

*Primary Examiner* — John A Ricci
(74) *Attorney, Agent, or Firm* — Young Basile Hanlon & MacFarlane, P.C.

(57) ABSTRACT

A comfort system to address the anxieties and emotional needs of children undergoing treatment for cancer is disclosed. The comfort system may include a toy friend, a simulated infusion set, a simulated IV bag, tubing, and a storage bag. The simulated infusion set may be shaped to resemble a butterfly or similar winged insect. The comfort system may also include one or more hats or head coverings that may be worn by the toy friend and/or the cancer patient.

6 Claims, 9 Drawing Sheets

COMFORT SYSTEM

CROSS-REFERENCE TO RELATED APPLICATION(S)

This application claims priority to and the benefit of U.S. Provisional Patent Application Ser. No. 63/300,126, filed Jan. 17, 2022, the entire disclosure of which is hereby incorporated by reference.

TECHNICAL FIELD

This invention relates to comfort systems and, more particularly, to novel systems and methods for providing emotional support and companionship to children undergoing treatment for cancer.

BACKGROUND

Children undergoing treatment for cancer must typically undergo many medical procedures that are difficult, uncomfortable, new, and frightening for the children involved. Such children can benefit from comfort systems that lower their anxiety or otherwise provide emotional support or companionship. Accordingly, what is needed are comfort systems that address the anxieties and emotional needs of children undergoing treatment for cancer.

SUMMARY

In view of the foregoing, in accordance with the invention as embodied and broadly described herein, an apparatus is disclosed in one embodiment of the present invention as including a toy friend for a young child to interact with, play with, and care for as the child experiences the challenges of cancer treatment. For example, as a child undergoes or experiences a session of chemotherapy, the toy friend may also undergo or experience a simulated session of chemotherapy using materials provided as part of a comfort system.

To simulate a session of chemotherapy, the comfort system may include a toy friend, a simulated IV bag, tubing, a simulated infusion set, a storage bag, and other components as desired or necessary. In selected embodiments, a toy friend may include a first fastener (e.g., a first snap element, first hook-and-loop material, or the like) at a location corresponding to a "chemo port." Accordingly, a simulated infusion set may include a second fastener (e.g., a second snap element, second hook-and-loop material, or the like) to allow the simulated infusion set to releasably fasten to the toy friend at a location on the upper chest of the toy to simulate a chemo port for the toy friend.

In selected embodiments, a simulated infusion set may resemble a "butterfly infusion set" or a "winged infusion set" in order to provide a softer or more attractive aspect for a young child. In certain embodiments, a simulated infusion set may include a nub or stump over which one end of the tubing may slide in order to connect the tubing to the simulated infusion set.

In selected embodiments, a simulated IV bag may simulate the presence of a liquid therewithin without actually containing any such liquid. Accordingly, two panels may provide or define a volume therewithin and provide the illusion that liquid is contained within that volume. A front or back panel may include markings or printed material providing or representing fill lines and/or a place for a name to be written. In certain embodiments, a simulated IV bag may include an exit conduit over or within which one end of the tubing may slide in order to connect the tubing to the simulated IV bag.

In selected embodiments, the comfort system may include a hat or head covering to be worn by the toy friend. Accordingly, the hat or head covering may resemble a hat or head covering that may be worn by a cancer patient that has lost his or her hair as a result of the treatments he or she is receiving.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figures 1, 2:
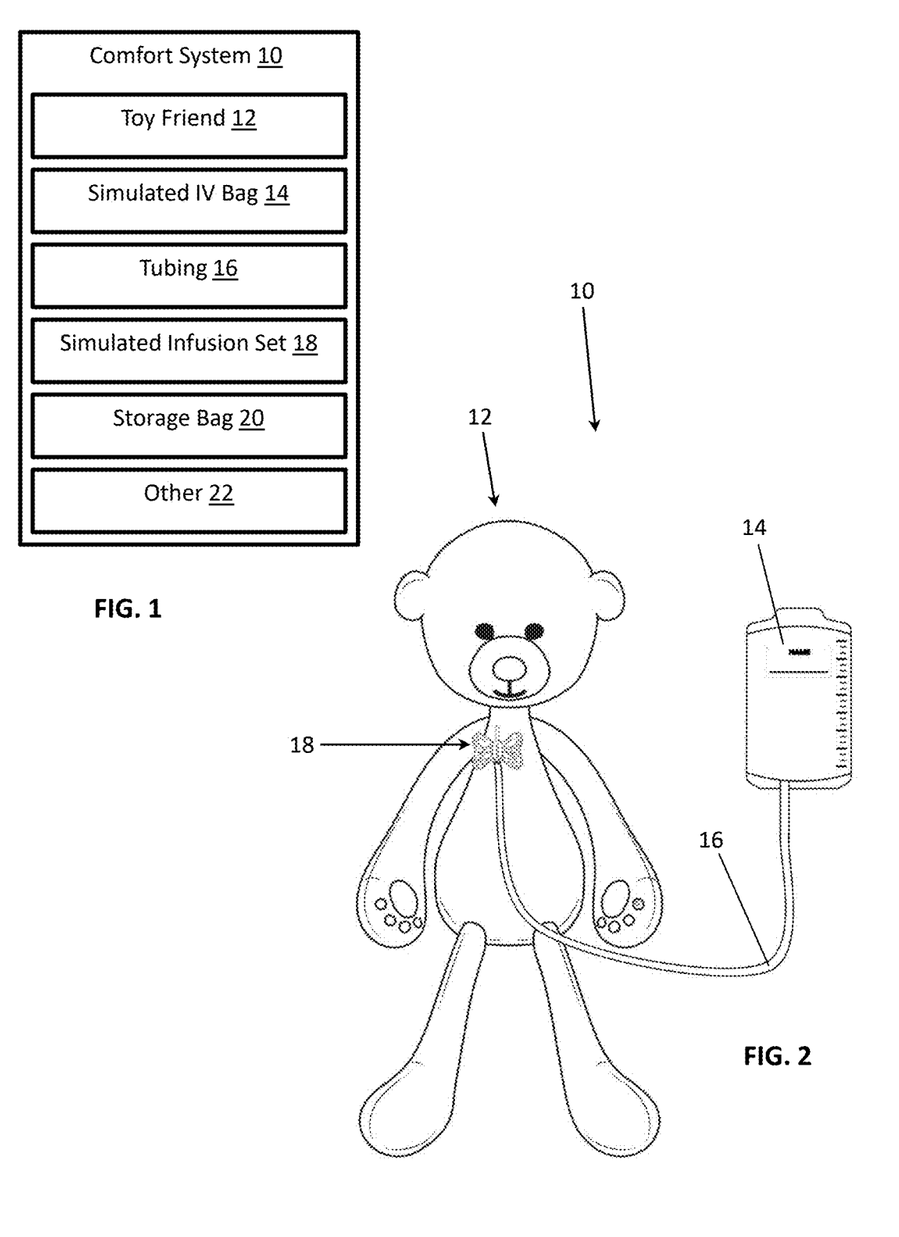
FIG. 1 is a schematic block diagram of one embodiment of a comfort system in accordance with the present invention.
FIG. 2 is a front view of one embodiment of a comfort system in accordance with the present invention.

Referring to FIGS. 1 and 2, a comfort system 10 in accordance with the present invention may include a toy friend 12, simulated IV bag 14, tubing 16, simulated infusion set 18, storage bag 20, other components 22 as desired or necessary, or the like or a combination or sub-combination thereof. In selected embodiments, a toy friend 12 may be a plush toy or stuffed animal. For example, a toy friend 12 may be a stuffed bear.

In use, a comfort system 10 may provide a toy friend 12 for a young child to interact with, play with, and care for as the child experiences the challenges of cancer treatment and, in particular, chemotherapy. For example, as a child undergoes or experiences a session of chemotherapy, the toy friend 12 may also undergo or experience a simulated session of chemotherapy using materials provided as part of a comfort system 10. Alternatively, or in addition thereto, medical professionals or family members may use or interact with the toy friend 12 in order to explain certain aspects of a treatment session to a young child. Such play, interaction, and the like may provide comfort, emotional support, and emotional release for young children experiencing the challenges of cancer treatment.

When a toy friend 12 undergoes or experiences a simulated session of chemotherapy, a simulated IV bag 14, tubing 16, and a simulated infusion set 18 may be removed from a storage bag 20 and assembled such that one end (e.g., a first end) of the tubing 16 engages the simulated IV bag 14 and the other end (e.g., a second end opposite the first end) of the tubing 16 engages the simulated infusion set 18. Meanwhile, the simulated infusion set 18 may be selectively and releasably connected to the toy friend 12. When the simulated session of chemotherapy is over, the simulated IV bag 14, tubing 16, and simulated infusion set 18 may be returned to the storage bag 20.

Figure 3:
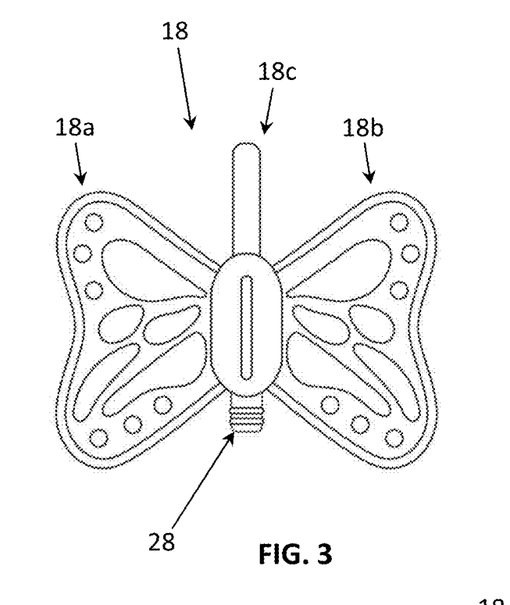
FIG. 3 is a front view of a simulated infusion set of the comfort system of FIG. 2.
Figure 4:
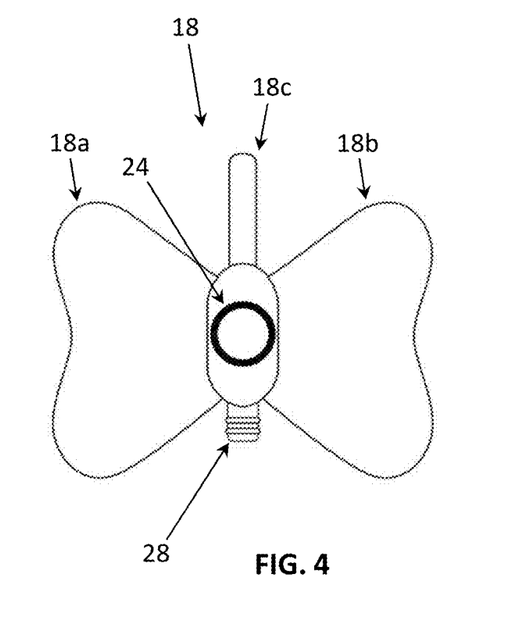
FIG. 4 is a back view of the simulated infusion set of the comfort system of FIG. 2.
Figure 5:
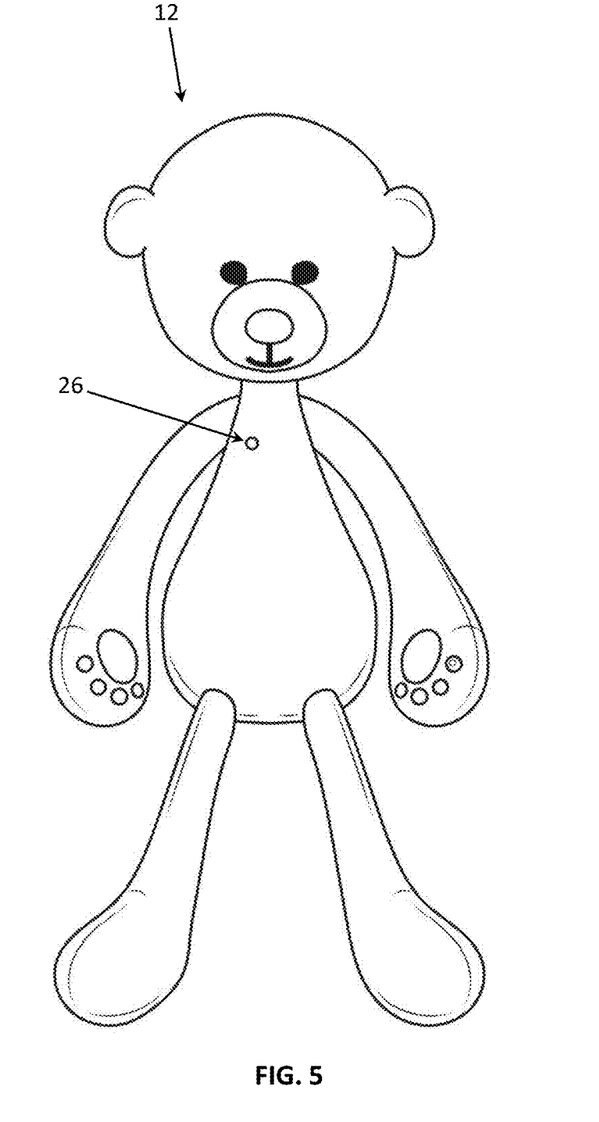
FIG. 5 is a front view of a toy friend of the comfort system of FIG. 2.
Figure 6:
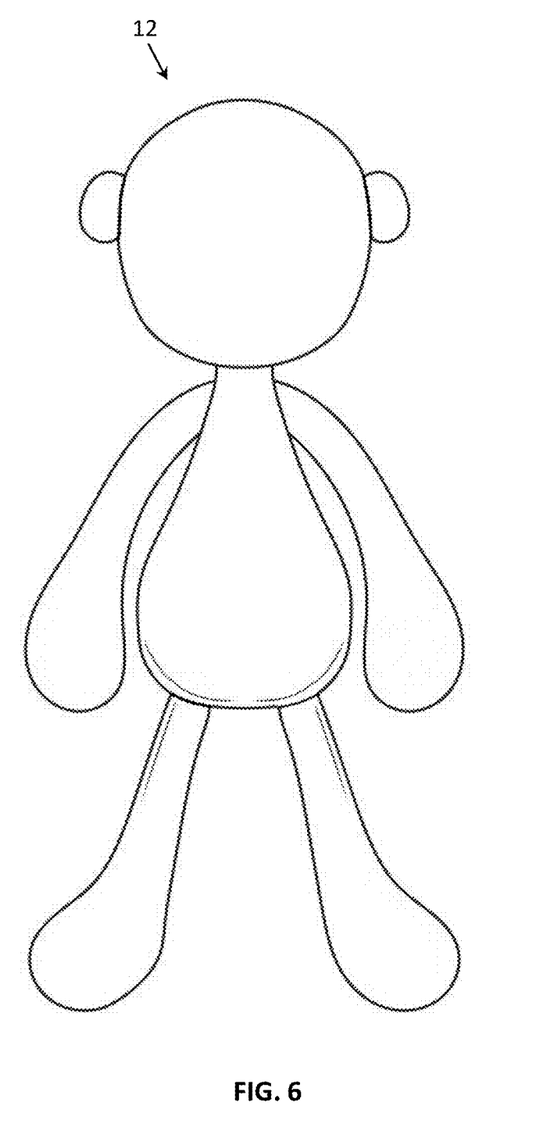
FIG. 6 is a back view of the toy friend of the comfort system of FIG. 2.
Figure 7:
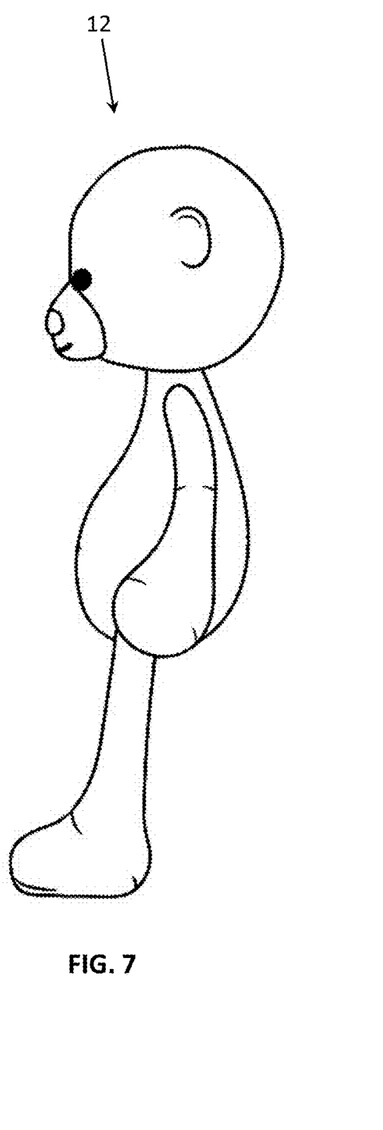
FIG. 7 is a left side view of the toy friend of the comfort system of FIG. 2.
Figure 8:
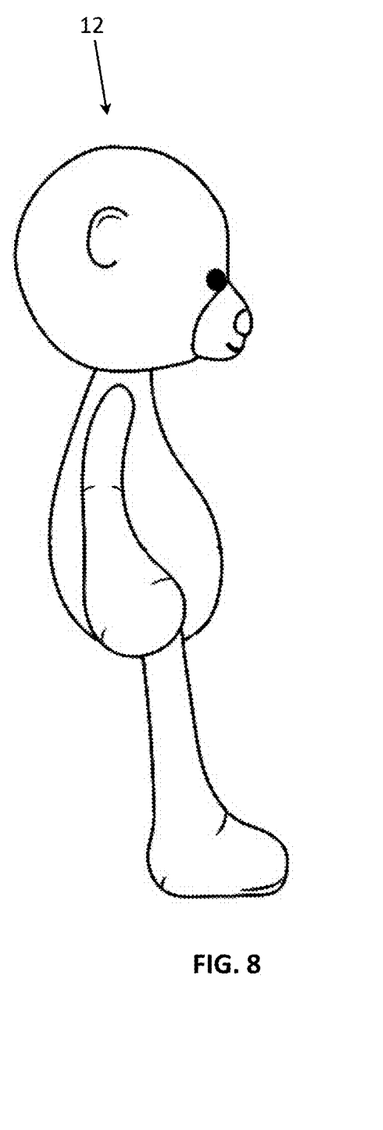
FIG. 8 is a right side view of the toy friend of the comfort system of FIG. 2.
Figure 9:
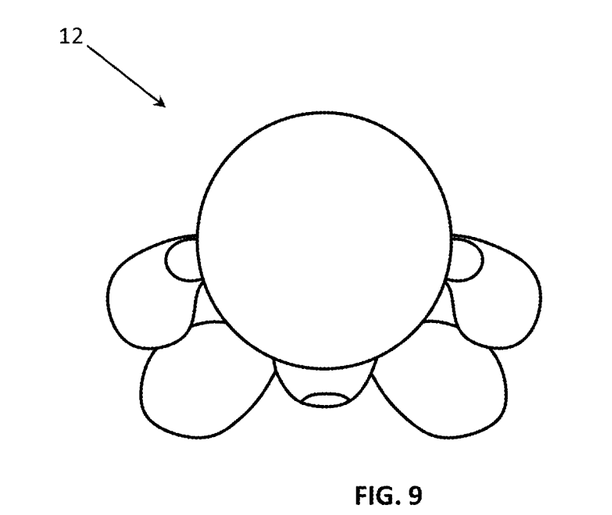
FIG. 9 is a top view of the toy friend of the comfort system of FIG. 2.
Figure 10:
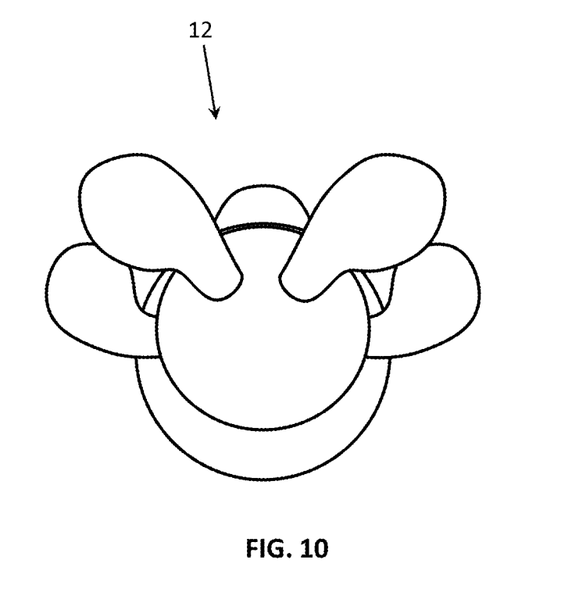
FIG. 10 is a bottom view of the toy friend of the comfort system of FIG. 2.
Figure 11:
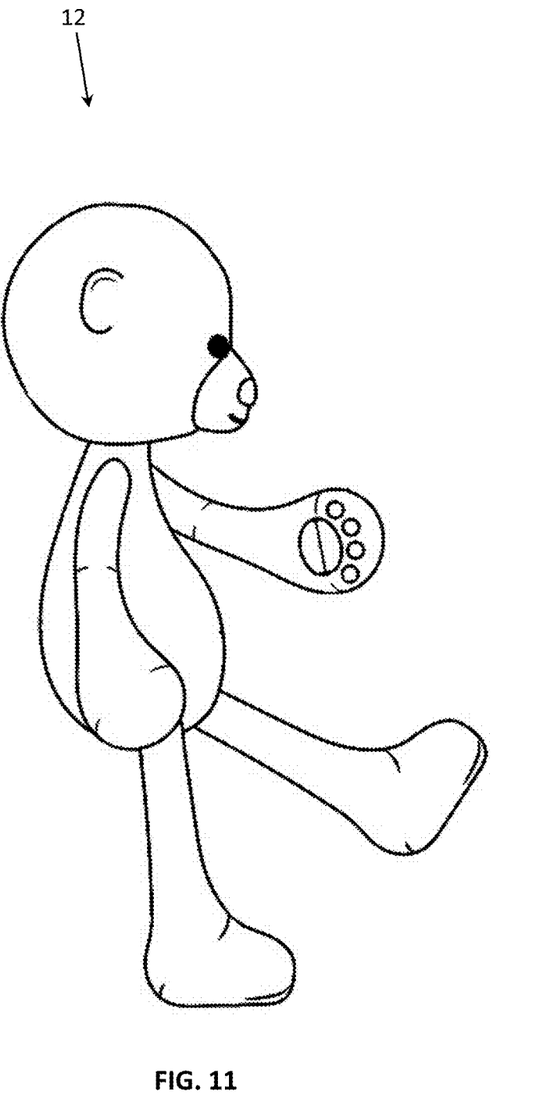
FIG. 11 is a right side view of the toy friend of the comfort system of FIG. 2 in an alternative position.

Referring to FIGS. 3-5, a simulated infusion set 18 may releasably fasten to a toy friend 12. In selected embodiments, a simulated infusion set 18 may releasably fasten to a toy friend 12 at a location corresponding to a "chemo port." That is, patients receiving chemotherapy often have an implanted port. Such ports are often placed about a few centimeters below the center of the patients' right collarbone. Accordingly, in selected embodiments, a simulated infusion set 18 may releasably fasten to a toy friend 12 at an analogous or similar location on the upper chest of the toy friend 12.

In selected embodiments, a simulated infusion set 18 may include a first snap element 24, a first hook-and-loop material, or the like (e.g., a first fastener). Similarly, a toy friend 12 may include a second snap element 26 (e.g., an element configured to selectively snap into or onto or otherwise engage a first snap element 24 of a simulated infusion set 18), a second hook-and-loop material (e.g., a material configured to selectively engage a first hook-and-loop material of a simulated infusion set 18), or the like (e.g., a second fastener). A second snap element 26, second hook-and-loop material, or the like may be or provide a simulated chemo port for the toy friend 12 and mechanically fasten a simulated infusion set 18 to the toy friend 12 when the first snap element 24, first hook-and-loop material, or the like is applied thereto. In selected embodiments, a second snap element 26, second hook-and-loop material, or the like may be positioned on the upper chest of the toy friend 12 (e.g., just below the center of what would by analogy be the right (or left) collarbone of the toy friend 12). As shown in FIG. 5, the second snap element 26, second hook-and-loop material, or the like may be visible on the toy friend 12 when disengaged from the first snap element 24, the first hook-and-loop material, or the like.

In selected embodiments, a simulated infusion set 18 may include or have a butterfly shape. Accordingly, a simulated infusion set 18 may resemble a "butterfly infusion set" or a "winged infusion set" while taking the idea of the "butterfly" or "winged" arrangement to a more full or complete representation of the insect. Thus, while resembling actual medical hardware, a simulated infusion set 18 in accordance with the present invention may have a softer or more attractive aspect for a young child. As shown in FIGS. 3 and 4, a simulated infusion set 18 may comprise a first wing portion 18a forming a first wing of the butterfly shape, a second wing portion 18b forming a second wing of the butterfly shape, and a center portion 18c positioned between the first wing portion 18a and the second wing portion 18b. The second snap element 26, second hook-and-loop material, or the like may be secured to the center portion 18c. In certain embodiments, the center portion 18c of a simulated infusion set 18 may include a stump 28 over which one end of the tubing 16 may slide in order to connect (e.g., selectively or releasably connect) the tubing 16 to the simulated infusion set 18.

Figure 12:
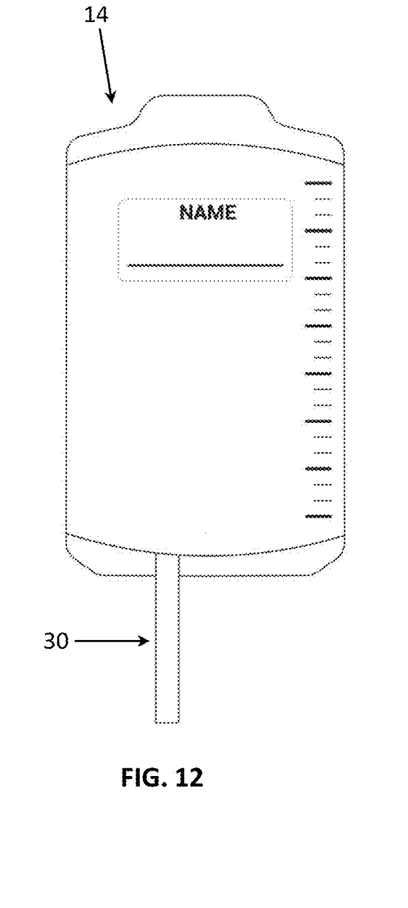
FIG. 12 is a front view of a simulated IV bag of the comfort system of FIG. 2.
Figure 13:
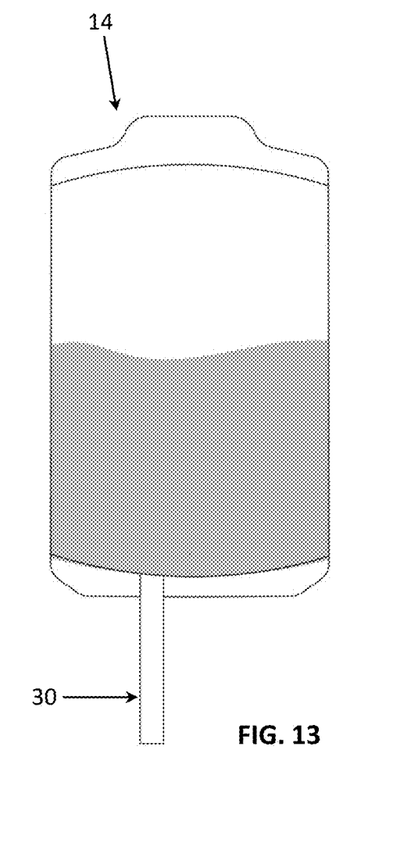
FIG. 13 is a back view of the simulated IV bag of the comfort system of FIG. 2.

Referring to FIGS. 12 and 13, a simulated IV bag 14 may simulate the presence of a liquid therewithin without actually containing any such liquid. For example, in selected embodiments, a simulated IV bag 14 may comprise two polymeric panels (e.g., a front panel and a back panel) connected, sealed, or welded together at the perimeter of the simulated IV bag 14. A front panel may include markings or printed material providing or representing fill lines and/or a place for a name (e.g., a name of the toy friend 12) to be written. A back panel may include markings or printed material providing or representing liquid (e.g., the back panel may have simulated liquid printed thereon). Accordingly, the two panels together may provide or define a volume therewithin and provide the illusion that liquid is contained within that volume. In certain embodiments, a simulated IV bag 14 may include an exit conduit 30 over or within which one end of the tubing 16 may slide in order to connect (e.g., selectively or releasably connect) the tubing 16 to the simulated IV bag 14.

Figure 14:
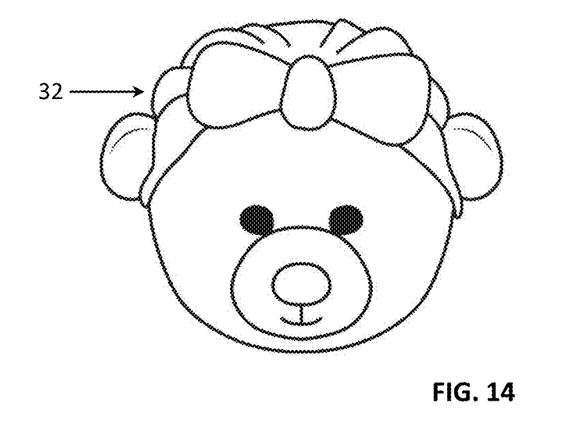
FIG. 14 is a front view of one embodiment of a hat or head covering that may be applied to or worn by the toy friend of the comfort system of FIG. 2.
Figure 15:
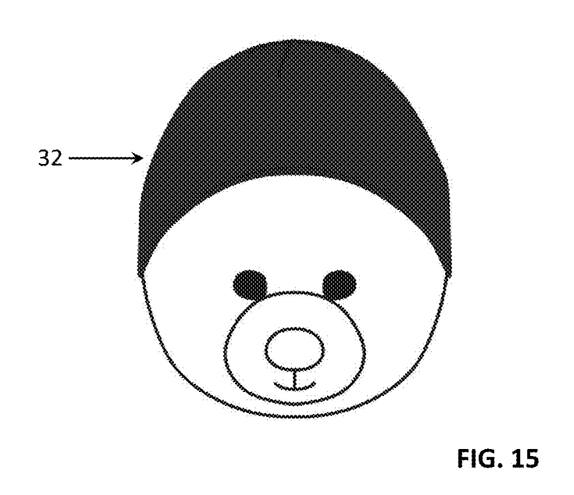
FIG. 15 is a front view of an alternative embodiment of a hat or head covering that may be applied to or worn by the toy friend of the comfort system of FIG. 2.

Referring to FIGS. 14 and 15, a toy friend 12 may include a hat or head covering 32. In selected embodiments, a hat or head covering 32 may resemble a hat or head covering 32 that may be worn by a cancer patient that has lost his or her hair as a result of the treatments he or she is receiving. For example, in certain embodiments, a comfort system 10 may include matching hats or head coverings 32, one that is suitable and/or sized for use on the toy friend 12, and another that is suitable and/or sized for use by the child undergoing treatment for cancer. In selected embodiments, the style and/or color of the hat or head covering 32 may reflect a gender of the toy friend 12 and/or the child.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A comfort system comprising:
  a simulated IV bag;
  a simulated infusion set having a butterfly shape and comprising a first wing portion forming a first wing of the butterfly shape, a second wing portion forming a second wing of the butterfly shape, a center portion positioned between the first wing portion and the second wing portion, and a first fastener secured to the center portion;
  tubing comprising a first end and a second end opposite the first end, wherein the first end is sized and shaped to engage the simulated IV bag and the second end is sized and shaped to engage the simulated infusion set;
  a toy friend comprising a plush toy or stuffed animal; and
  the toy friend further comprising a second fastener sized and shaped to selectively engage the first fastener, the second fastener being positioned on an upper chest of the toy friend and providing a simulated chemo port for the toy friend that is visible on the toy friend when the second fastener is disengaged from the first fastener.

2. The comfort system of claim 1, wherein:

the simulated IV bag comprises a front panel and a back panel;

the front panel and the back panel are connected together at a perimeter of the simulated IV bag to define a volume therewithin; and the back panel has simulated liquid printed thereon.

3. The comfort system of claim 1, wherein:

the center portion comprises a stump; and the second end of the tubing is sized to slide over the stump to connect the tubing to the simulated infusion set.

4. A comfort system comprising:

a simulated IV bag comprising a front panel and a back panel, the front panel and the back panel being connected together at a perimeter of the simulated IV bag to define a volume therewithin, the back panel having simulated liquid printed thereon;

a simulated infusion set having a butterfly shape and comprising a first wing portion forming a first wing of the butterfly shape, a second wing portion forming a second wing of the butterfly shape, a center portion positioned between the first wing portion and the second wing portion, and a first fastener secured to the center portion;

tubing comprising a first end and a second end opposite the first end, wherein the first end is sized and shaped to engage the simulated IV bag and the second end is sized and shaped to engage the center portion of the simulated infusion set;

a toy friend comprising a plush toy or stuffed animal; and the toy friend further comprising a second fastener sized and shaped to selectively engage the first fastener, the second fastener being positioned on an upper chest of the toy friend and providing a simulated chemo port for the toy friend.

5. The comfort system of claim 4, wherein:

the center portion comprises a stump; and the second end of the tubing is sized to slide over the stump to connect the tubing to the simulated infusion set.

6. The comfort system of claim 4, wherein the second fastener is visible on the toy friend when the second fastener is disengaged from the first fastener.

* * * * *